(12) United States Patent
Yoshioka

(10) Patent No.: US 6,276,714 B1
(45) Date of Patent: Aug. 21, 2001

(54) INFLATABLE BELT AND INFLATABLE BELT DEVICE

(75) Inventor: Daisuke Yoshioka, Shiga (JP)

(73) Assignee: Takata Corporation (JP)

( * ) Notice: Subject to any disclaimer, the term of this patent is extended or adjusted under 35 U.S.C. 154(b) by 0 days.

(21) Appl. No.: 09/327,546

(22) Filed: Jun. 8, 1999

(30) Foreign Application Priority Data

Jun. 8, 1998 (JP) ................................. 10-159297

(51) Int. Cl.[7] .................................................. B60R 21/18
(52) U.S. Cl. ............................................. 280/733; 280/805
(58) Field of Search .................................. 280/733, 802, 280/805, 729

(56) References Cited

U.S. PATENT DOCUMENTS

| | | | |
|---|---|---|---|
| 3,146,460 | * 9/1964 | Henderson | 280/733 |
| 3,430,979 | * 3/1969 | Terry et al. | 280/733 |
| 3,801,156 | * 4/1974 | Granig | 280/733 |
| 3,830,519 | * 8/1974 | Lewis | 280/733 |
| 3,888,503 | 6/1975 | Hamilton . | |
| 3,900,210 | * 8/1975 | Lohr et al. | 280/733 |
| 3,933,370 | * 1/1976 | Abe et al. | 280/733 |
| 3,975,037 | * 8/1976 | Hontschik et al. | 280/733 |
| 5,456,491 | 10/1995 | Chen et al. | 280/733 |
| 5,466,003 | 11/1995 | Tanaka et al. | 280/733 |
| 5,833,265 | * 11/1998 | Seymour . | |
| 5,941,564 | * 8/1999 | Acker | 280/733 X |

FOREIGN PATENT DOCUMENTS

| | | |
|---|---|---|
| 2046426 | 3/1972 | (DE) . |
| 3232946 | * 3/1984 | (DE) . |
| 0765780 | 4/1997 | (EP) . |
| 5-85301 | 4/1993 | (JP) . |
| 258239 | * 10/1998 | (JP) . |
| 11189117 | * 7/1999 | (JP) . |
| 11342827 | * 12/1999 | (JP) . |
| 11348721 | * 12/1999 | (JP) . |

* cited by examiner

Primary Examiner—Brian L. Johnson
Assistant Examiner—Bryan Fischmann
(74) Attorney, Agent, or Firm—Foley & Lardner

(57) ABSTRACT

A belt body is formed in an envelope-like or elongated configuration by superposing two long base fabrics on each other and sewing them along their peripheries by a sewing yarn. A gas inlet is formed at one end side of the belt body. The inside of the belt body is divided by sewing yarns into a first chamber and two second chambers which extend in the longitudinal direction. The sewing yarns are weaker than the sewing yarn used to sew the periphery, so that the second sewing yarns are broken when the gas pressure in the first chamber reaches a predetermined value. The second chambers extend along both sides of the first chamber. One of the second chambers has a vent hole formed therein. In another embodiment, the belt body is divided into three chambers. The first chamber extends from the gas inlet to the vicinity of the middle and the third chamber extends from the other end toward the middle. The second chamber is located between the first chamber and the third chamber. These inflatable belts enable the sufficiently quick inflation of the inflatable belt without increasing the gas generating pressure of a gas generator and without hastening the completion of gas generation.

19 Claims, 4 Drawing Sheets

(a)

(b)

(c)

(d)

(e)

INFLATABLE BELT AND INFLATABLE BELT DEVICE

BACKGROUND OF THE INVENTION

1. Field of the Invention

The present invention relates to an inflatable belt and an inflatable belt device for protecting a vehicle occupant during a vehicle collision and, more particularly, to an inflatable belt which can be inflated with gas introduced from a gas inlet and an inflatable belt device having such an inflatable belt.

2. Description of the Related Art

An inflatable belt device of this type is disclosed in Japanese Unexamined Patent Publication H05-85301 and is shown in FIGS. 3(a) and 3(b). This passenger protective device 1 includes a shoulder belt 2 extending diagonally from the right side to the left side of a passenger, a lap belt 3 extending from the right side to the left side of the passenger, a buckle 4 fixed to, for example, a vehicle floor, a tongue 5 to be inserted into and engaged with the buckle 4 when the passenger wears the belt, and an intermediate guide 6 for guiding the shoulder belt 2.

The shoulder belt 2 includes a webbing 2a, which is the same as a typical conventional seat belt, and an inflatable belt 2b connected to an end of the webbing 2a. The webbing 2a is slidably hung in the intermediate guide 6. The other end of the webbing 2a is connected to a shoulder belt retractor 7 with an emergency locking mechanism (ELR), which is fixed to the vehicle body. The webbing 2a is arranged such that it is wound into the shoulder belt retractor 7.

The inflatable belt 2b is positioned so that it contacts the passenger and is connected to the tongue 5 at an end opposite to the end connected to the webbing 2a. The lap belt 3 is composed of a webbing, which is the same as a typical conventional seat belt, having one end is connected to the tongue 5 and the other end connected to a lap belt retractor 8 (ELR), which is fixed to the vehicle body. A gas generator 9 is connected to the buckle 4. The gas generator 9 is actuated in emergency situations, e.g., vehicle collisions, to generate high-pressure gas. The tongue 5 and the buckle 4 are each provided with passages for introducing gas from the gas generator 9 into the inflatable belt 2b.

The inflatable belt 2b of the shoulder belt 2 includes a belt body 2c formed in an envelope-like shape and a cover 2d. The belt body 2c is folded, shown in solid lines in FIG. 3(b), and then covered by the cover 2d. The ends of the cover 2d are then connected to each other by stitching 2e so that the inflatable belt 2b is maintained in a band-like configuration. The stitching 2e of the cover 2d is easily torn by the force of the shoulder belt 2 expanding when the gas generator 9 is actuated so that the inflatable belt 2b is deployed, shown by a two-dot chain line in FIG. 3(b).

The belt body 2c is made of, for example, rubber coated fabric and the cover 2d is made of a flexible knit with excellent stretchability.

FIGS. 4(a) through 4(d) are perspective views illustrating the manufacturing process of a conventional inflatable belt. Conventionally, two pieces of base fabrics 11, 12 are first cut to correspond to the configuration of a belt body being manufactured. The base fabrics 11, 12 are then superposed on each other (FIG. 4(a)) and sewn together along their peripheries to make an envelope-like or elongated belt body 14 (FIG. 4(b), numeral 13 designates stitching). After that, the belt body 14 is longitudinally folded into a band-like configuration (FIG. 4(c)). Last, the belt body 14 is accommodated in a knit cover 15 (FIG. 4(d)), thereby making the inflatable belt 16.

The inside of the conventional inflatable belt is composed of only a single chamber. A gas inlet is provided only at one end side of the belt body, thus, the belt body is inflated from the one end side toward the other end side when gas is introduced from the gas generator. To ensure that a portion on the other end side is filled with the gas so that the belt body is inflated as a whole before the occupant bends over the inflatable belt, the gas generator must have a capacity that is large enough to generate a large amount of gas in a short period of time.

These difficulties or problems with the current alternatives are not intended to be exhaustive, but are many which tend to reduce the desirability of known seat belts. Other notable problems may exist; those presented above, however, should be sufficient to demonstrate that devices appearing in the past are amenable to worthwhile improvement.

SUMMARY OF THE INVENTION

Accordingly, it is a general object of the invention to provide a method of manufacturing an inflatable belt that will obviate or minimize the above difficulties.

It is a specific object of the invention to provide an inflatable belt, and an inflatable belt device having such an inflatable belt, that can be inflated from one end side to the other end side within a sufficiently short period using a gas generator having a smaller capacity.

It is another object of the present invention to provide an inflatable belt and an inflatable belt device that enables the vicinity of the longitudinal middle of the belt to be quickly inflated without increasing the capacity of a gas generator.

A preferred embodiment of the invention intended to accomplish at least some of the foregoing objects includes a gas inlet at one end of the inflatable belt; a first chamber communicating with the gas inlet; and a second chamber separated from the first chamber, wherein, when a gas pressure inside the first chamber reaches a predetermined value, the first chamber and the second chamber fluidly communicate with each other.

Additional objects and advantages of the invention will be set forth in the following description of the preferred embodiments and, in part, will be obvious from the description or through practicing the invention. The objects and advantages may be realized through the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and, together with the above general description and the following detailed description, serve to explain the principles of the invention.

DETAILED DESCRIPTION OF THE PREFERRED EMBODIMENTS

Figure 1:
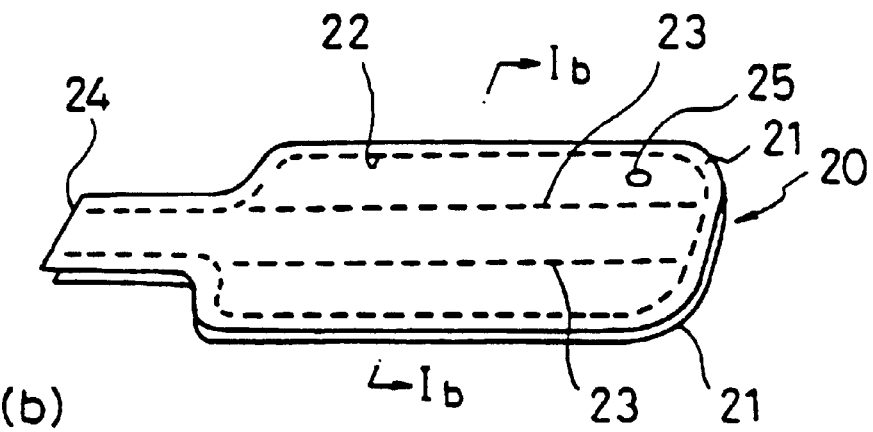
FIG. 1(a) is a perspective view showing an embodiment of an envelope-like or elongated belt body used in an inflatable belt of the present invention.
FIG. 1(b) is a sectional view taken along a line b—b of FIG. 1(a)
FIG. 1(c) is a sectional view of the belt body during inflation.
FIG. 1(d) is a sectional view of the belt body after the inflation.
Figure 1:
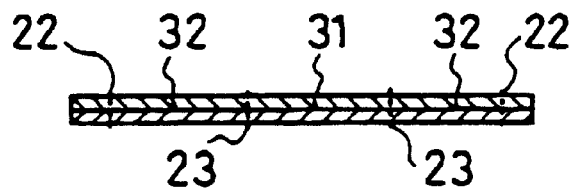
Figure 1:
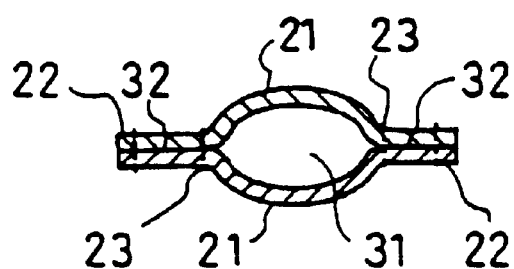
Figure 1:
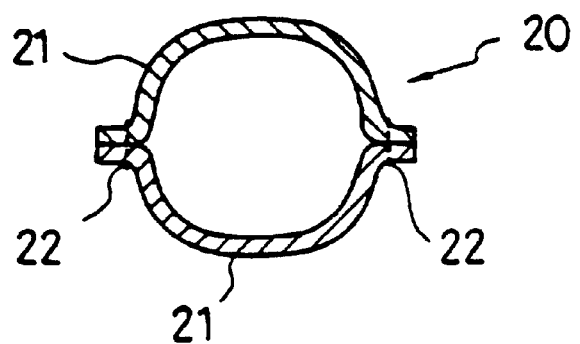

Referring now to the drawings, and initially to FIGS. 1(a), there will be seen a belt body 20, which is formed in an envelope or elongated configuration by superposing two long base fabrics 21, 21 on each other and then sewing them along their peripheries with a first sewing yarn 22. A gas inlet 24 is formed at one end side of the belt body 20. The inside of the belt body 20 is divided by second sewing yarns 23.

The gas inlet 24 is connected to, for example, a tongue having a gas duct. The tongue is engaged with a buckle having a gas duct and a gas generator, so as to allow gas from the gas generator to be introduced into the belt body 20 via the gas ducts.

As shown in FIGS. 1(a) and 1(b), the second sewing yarns 23 divide the inside of the belt body 20 into a first chamber 31 and two second chambers 32. The first and the two second chambers extend in the longitudinal direction.

The second sewing yarns 23 preferably are weaker than the first sewing yarn 22 so that the second sewing yarns 23 break when the gas pressure in the first chamber 31 reaches a predetermined value. The second chambers 32 extend alone both sides of the first chamber 31. One of the second chambers 32 is provided with a vent hole 25.

Figure 3:
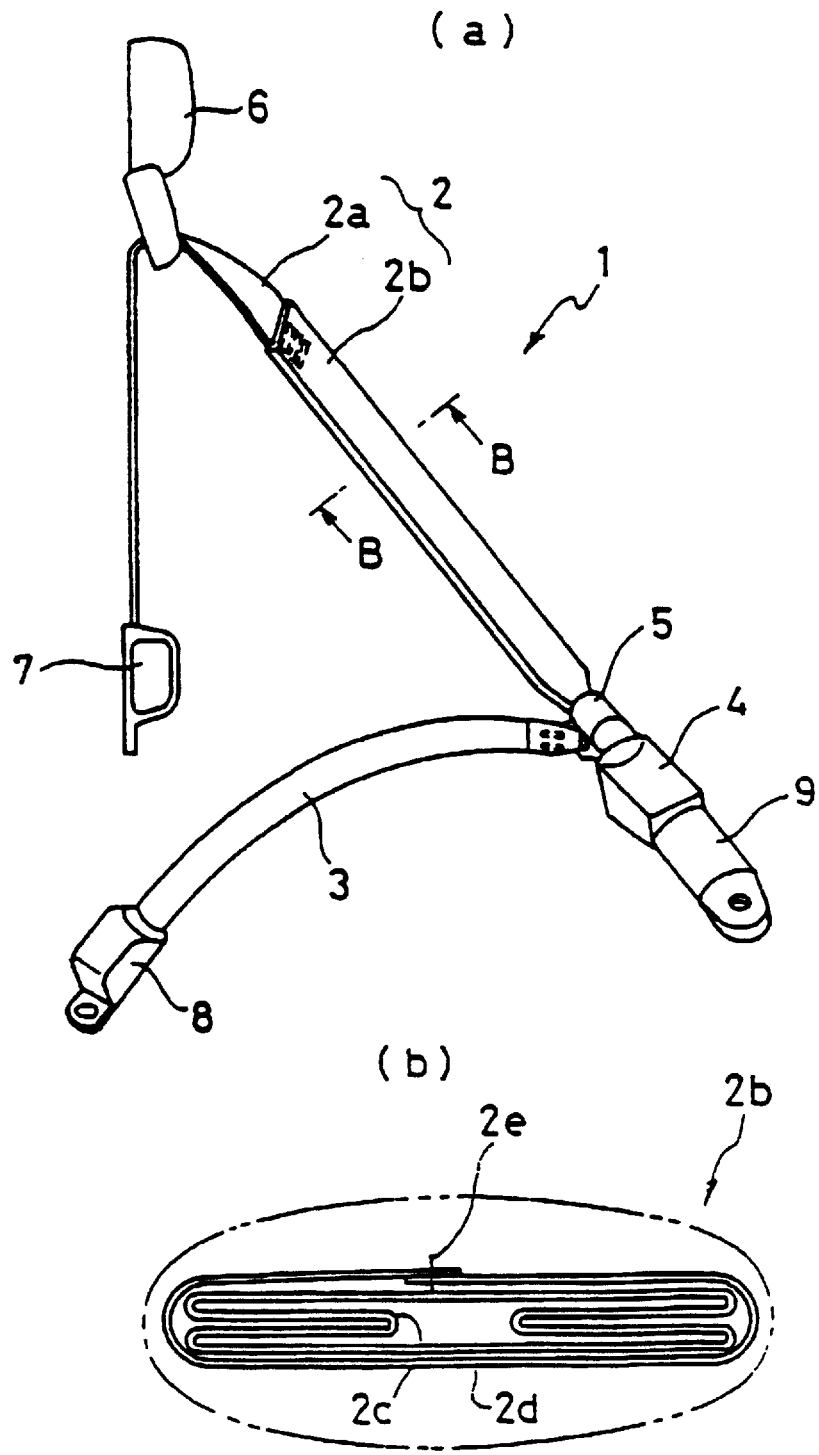
FIGS. 3(a) and 3(b) are views showing the structure of a conventional inflatable belt device.
Figure 4:
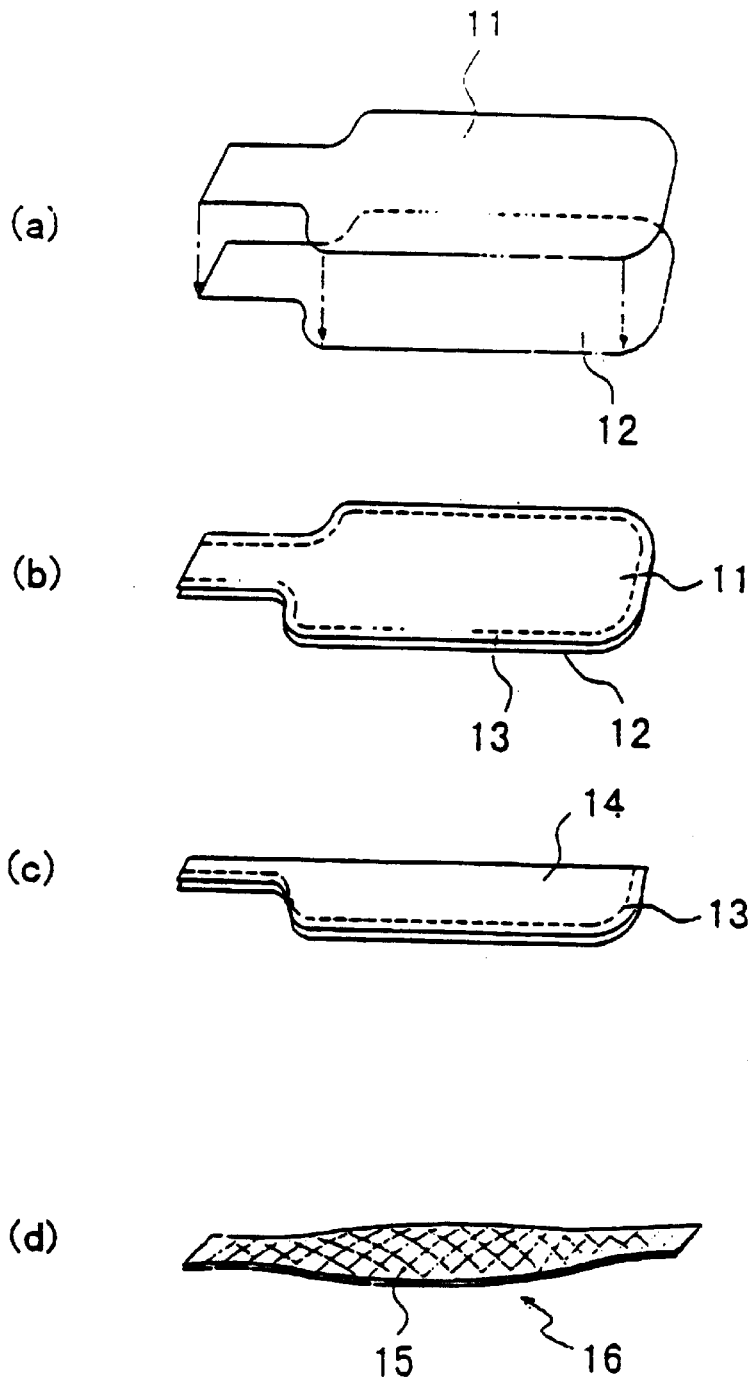
FIGS. 4(a)–4(d) are views illustrating the manufacturing process of an envelope-like belt body of a conventional inflatable belt.

The belt body 20 is also folded into a long band-like configuration and is enclosed by a cover to make an inflatable belt as shown in FIGS. 3(a), 3 (b).

In the inflatable belt structured as mentioned above and an inflatable belt having this inflatable belt, when the gas generator is actuated due to a vehicle collision or roll-over, gas is introduced first into the first chamber 31 through the gas inlet 24 so that the first chamber 31 is inflated as shown in FIG. 1(c). When the gas pressure in the first chamber 31 reaches the predetermined value, the second sewing yarns 23 are broken so that the second chambers 32 are also inflated as shown in FIG. 1(d). When the occupant bends over the belt body 20 inflated in this manner, gas within the belt body 20 is discharged through the vent hole 25, thereby absorbing the impact applied to the occupant.

According to this inflatable belt, the first chamber 31 can be quickly inflated from the end nearer to the inlet 24 to the other end prior to the second chambers 32 being inflated. During this first inflation segment, gas is not discharged through the vent hole 25. Thus, the first chamber 31 is inflated sufficiently quickly even with a small output from the gas generator.

After the first chamber 31 is inflated, the second chambers 32 are inflated. During inflation of the second chambers, gas is introduced quickly throughout the second chambers 32 from the already inflated first chamber 31, so that the entire inflatable belt 30 can be inflated in a short period of time.

Figure 2:
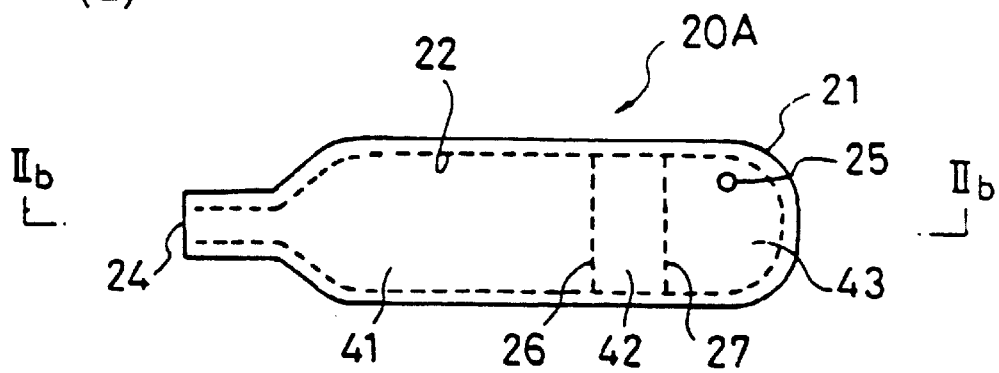
FIG. 2(a) is a plan view of an envelope-like or elongated belt body of an inflatable belt according to another embodiment.
FIG. 2(b) is a sectional view taken along a line b—b of FIG. 2(a)
FIGS. 2(c)–2(e) are sectional views of the belt body illustrating the inflation process.
Figure 2:
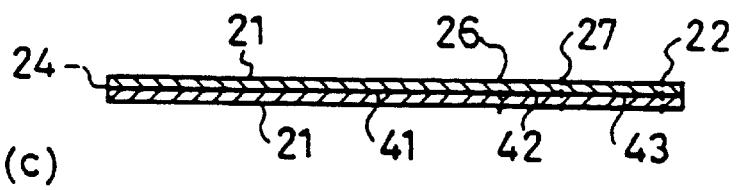
Figure 2:
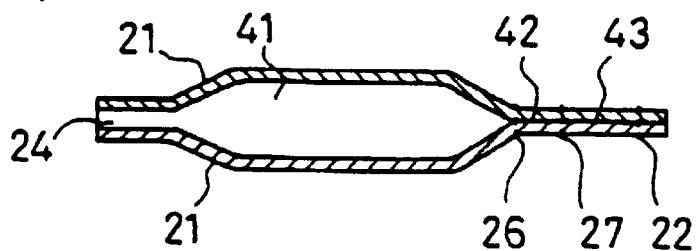
Figure 2:
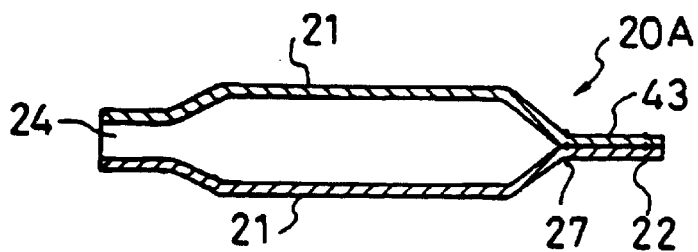
Figure 2:
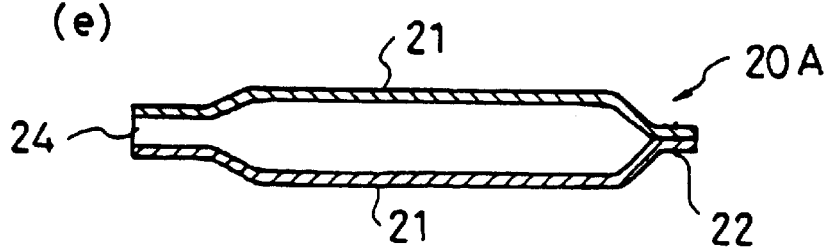

Referring now to FIG. 2(a), there will be seen a belt body 20 A, which is made from two long fabrics 21, 21 superposed on each other and then sewn together along their peripheries with a first sewing yarn 22. The belt body 20 A has a gas inlet 24 at one end side thereof.

As shown in FIGS. 2(a) and 2(b), the inside of the belt body 20 A is divided into a first chamber 41, a second chamber 42, and a third chamber 43 by second and third sewing yarns 26, 27, which extend in the width direction of the belt body 20A. The second and third sewing yarns 26, 27 are weaker than the first sewing yarn 22 so that the second and third sewing yarns 26, 27 are broken when the gas pressure in the first chamber 41 or the second chamber 42 reaches a predetermined value.

The first chamber 41 communicates directly with the gas inlet 24 formed on one end side of the belt body 20A. The first chamber 41 extends from one end side to approximately the middle of the belt body 20A. The third chamber 43 is positioned at the other end side of the belt body 20A and the second chamber 42 is positioned between the first chamber 41 and the third chamber 43. The third chamber 43 has a vent hole 25 formed therein.

As shown in FIG. 2(c), when the gas generator is actuated to introduce gas into the belt body 20A through the gas inlet 24, the first chamber 41 is inflated.

When the gas pressure in the first chamber 41 reaches a predetermined value, the second sewing yarn 26 is broken so that the first chamber 41 and the second chamber 42 communicate with each other as shown in FIG. 2(d). As a result, the second chamber 42 is inflated.

As the gas pressure in the first chamber 41 and the second chamber 42 reaches a predetermined value, the third sewing yarn 27 is broken so that the third chamber 43 is also inflated.

When the occupant bends over the belt body 20 A thus inflated, gas within the belt body 20A is discharged through the vent hole 25, thereby absorbing the impact applied to the occupant.

According to this embodiment, gas in the first and second chambers 41, 42 is not discharged through the vent hole 25 until the third sewing yarn 27 is broken and the third chamber 43 of the belt body 20A is inflated. Therefore, the portion from the one end side (the gas inlet 24 side) to approximately the middle of the inflatable belt can be quickly inflated without increasing the output of the gas generator. Because the occupant's weight is mostly rested on the vicinity of the middle of the belt body 20A during a vehicle collision, the quick inflation of the vicinity of the middle of the inflatable belt enables sufficient protection of the occupant even before the third chamber 43 is fully inflated. The second and third yarns may or may not have identical strengths.

Stitching or sewing yarns 23, 26, 27 are used to construct the first chambers 31, 41, the second chambers 32, 42, and the third chamber 43. It is possible, however, to use an adhesive agent in place of the stitching or sewing yarn. In addition, a thermoplastic resin may be applied to the base fabrics and the chambers defined by welding or melting the resin between the base fabrics.

As described in the above, according to the present invention, the inflatable belt can be sufficiently quickly inflated without increasing the volume generated by the gas generator and without increasing the gas gene ration speed.

An inflatable belt of the present invention is a belt for protecting an occupant in a vehicle seat which is inflated when gas is introduced into the inflatable belt through a gas inlet. The inside of the inflatable belt is divided into at least two chambers in which a first chamber communicates with the gas inlet. The at least one second chamber is separated from the first chamber by a partition. The partition allows the first chamber to communicate with the second chamber when the gas pressure in the first chamber reaches a predetermined value.

An inflatable belt device or safety belt restraint system of the present invention includes such an inflatable belt and a gas generator for inflating the inflatable belt.

According to the present invention, when the gas generator is actuated to introduce gas into the inflatable belt, the first chamber is quickly inflated and, after that, the partition is opened so that the second chamber is inflated.

According to one aspect of the present invention, the first chamber is designed to extend from one end side to the other end side of the inflatable belt, so that the inflatable belt can be quickly inflated from the one end side to the other end side by inflating the first chamber. In a case where gas supplied from the gas generator inflates only the first chamber, the first chamber is inflated with the gas being kept in high pressure because the volume of the first chamber is smaller than that of the whole inflatable belt.

After the pressure in the first chamber reaches a predetermined value, the partition is opened so that the gas enters into the second chamber. During the inflation of the second chamber, gas is introduced quickly throughout the second chambers from the already inflated first chamber, so that the entire inflatable belt is inflated in a short period of time.

According to another aspect of the present invention, the first chamber is designed to extend from one end side to the vicinity of the middle of the inflatable belt, and the second chamber is disposed on the other end side. In this case, in the process of inflating the inflatable belt, the portion from the one end side to the vicinity of the middle of the inflatable belt is first quickly inflated and, after that, the second chamber on the other end side is inflated. The vicinity of the middle of the inflatable belt, where the occupant's weight is mostly rested on, can be sufficiently inflated in a short period of time.

The partition is preferably constructed from stitching by yarn, adhesion, welding, or melting.

According to the present invention, it is preferable that the second chamber or the third chamber communicate with the atmosphere through a vent hole. According to the invention, gas from the gas generator is not discharged through the vent hole when the first chamber is being inflated, so that the first chamber can be quickly inflated.

Additional modifications and advantages may readily appear to one skilled in the art. The invention, therefore, is not limited in to the specific details set forth herein. Accordingly, various modifications may be made without departing from the spirit or scope of the invention as defined by the appended claims and their equivalents.

This application is one of seven copending applications:

| U.S. Serial No. | U.S. Filing Date | Our Docket No. | Japanese Application No. |
| --- | --- | --- | --- |
| Unknown | June 8, 1999 | 086142/0246 | H10-159293 |
| Unknown | June 8, 1999 | 086142/0247 | H10-159296 |
| Unknown | June 8, 1999 | 086142/0248 | H10-159295 |
| Unknown | June 8, 1999 | 086142/0249 | H10-159297 |
| Unknown | June 9, 1999 | 086142/0250 | H10-160777 |
| Unknown | June 9, 1999 | 086142/0251 | H10-160780 |
| Unknown | June 9, 1999 | 086142/0253 | H10-160778 and H10-160779 |

The instant application hereby incorporates by reference the entire specification including claims and abstract and the drawings of each of the other six applications.

What is claimed is:

1. An inflatable belt for protecting an occupant in a vehicle seat, the inflatable belt comprising:

a gas inlet at one end of the inflatable belt;

a first chamber communicating with the gas inlet; and a second chamber separated from and not in fluid communication with the first chamber, wherein, the inflatable belt is configured so that when a gas pressure inside the first chamber reaches a predetermined value, the first chamber and the second chamber fluidly communicate with each other.

2. An inflatable belt as claimed in claim 1, wherein a yarn separates the first chamber from the second chamber and the yarn breaks when the gas pressure reaches the predetermined level.

3. An inflatable belt as claimed in claim 1, wherein an adhesive separates the first chamber from the second chamber and the adhesive breaks when the gas pressure reaches the predetermined level.

4. An inflatable belt as claimed in claim 1, wherein the first and the second chambers extend in a longitudinal direction from the gas inlet to an other end of the inflatable belt.

5. An inflatable belt as claimed in claim 1, wherein the first and second chambers extend in a direction perpendicular to a longitudinal direction of the inflatable belt.

6. An inflatable belt as claimed in claim 1, wherein the first chamber extends from the gas inlet to approximately a middle of the inflatable belt.

7. An inflatable belt as claimed in claim 5, further comprising a third chamber disposed between the second chamber and the other end of the inflatable belt.

8. An inflatable belt as claimed in any one of claim 1, further comprising a vent hole in the second chamber.

9. An inflatable belt as claimed in claim 7, further comprising a vent hole in the third chamber.

10. An inflatable belt comprising:

two base fabric panels connected to each other at their peripheries and having a gas inlet at one end;

a first partition separating the connected base fabric panels into a first and a second chamber, wherein, when a pressure in the first chamber reaches a predetermined level, the first partition breaks and the first chamber and the second chamber fluidly communicate with each other.

11. An inflatable belt as claimed in claim 10, further comprising a second partition separating the connected base fabric panels into the first chamber and two second chambers extending in a longitudinal direction, wherein, when the first chamber reaches a predetermined pressure, the first and second partitions break and the first and two second chambers fluidly communicate with one another.

12. An inflatable belt as claimed in claim 10, wherein the first and second chambers extend in a longitudinal direction.

13. An inflatable belt as claimed in claim 10, wherein the first and second chambers extend in a direction that is perpendicular to a longitudinal direction.

14. An inflatable belt as claimed in claim 10, further comprising a second partition separating the connected base fabric panels into the first, the second, and a third chamber, the second partition extending in a direction that is perpendicular to a longitudinal direction, wherein, when the first chamber reaches a predetermined pressure, the first partition breaks and the first and second chambers fluidly communicate with each other, and wherein, when the second chamber reaches a predetermined pressure, the second partition breaks and the second and third chambers fluidly communicate with each other.

15. An inflatable belt as claimed in claim 10, wherein the first partition is formed by stitching the two base fabric panels together.

16. An inflatable belt as claimed in claim 10, wherein the first partition is formed by adhering the two base fabric panels together.

17. An inflatable belt as claimed in claim 10, wherein the base fabric panels are coated with a resin.

18. An inflatable belt as claimed in claim 10, wherein the first partition is formed by melting the two base fabric panels together.

19. A safety belt system comprising:

a webbing;

an inflatable belt connected at one end to the webbing, the inflatable belt including a gas inlet at one end of the inflatable belt; a first chamber communicating with the gas inlet; and a second chamber separated from and not in fluid communication with the first chamber, wherein, the inflatable belt is configured so that when a gas pressure inside the first chamber reaches a predetermined value, the first chamber and the second chamber fluidly communicate with each other;

a tongue having a duct communicating with the gas inlet of the inflatable belt; and a gas generator communicating with the duct of the tongue for supplying a gas into the inflatable belt to inflate the inflatable belt.

* * * * *